United States Patent
Darolia et al.

(10) Patent No.: US 7,862,901 B2
(45) Date of Patent: Jan. 4, 2011

(54) YTTRIA CONTAINING THERMAL BARRIER COATING TOPCOAT LAYER AND METHOD FOR APPLYING THE COATING LAYER

(75) Inventors: Ramgopal Darolia, West Chester, OH (US); Ming Fu, Hamilton, OH (US)

(73) Assignee: General Electric Company, Schenectady, NY (US)

(*) Notice: Subject to any disclaimer, the term of this patent is extended or adjusted under 35 U.S.C. 154(b) by 1043 days.

(21) Appl. No.: 11/611,364

(22) Filed: Dec. 15, 2006

(65) Prior Publication Data

US 2008/0145674 A1 Jun. 19, 2008

(51) Int. Cl.
*B32B 15/00* (2006.01)
*B05D 1/36* (2006.01)
*F01D 5/14* (2006.01)

(52) U.S. Cl. .............. 428/632; 416/241 B; 416/241 R; 428/701; 428/633; 428/433

(58) Field of Classification Search .................. None
See application file for complete search history.

(56) References Cited

U.S. PATENT DOCUMENTS

| | | | |
|---|---|---|---|
| 6,071,627 A * | 6/2000 | Yasuda et al. ............. 428/610 |
| 6,261,643 B1 | 7/2001 | Hasz et al. | |
| 6,465,090 B1 | 10/2002 | Stowell et al. | |
| 6,858,334 B1 | 2/2005 | Gorman et al. | |
| 6,887,585 B2 | 5/2005 | Herbst-Dederichs | |
| 6,890,668 B2 * | 5/2005 | Bruce et al. ................. 428/632 |
| 6,893,750 B2 | 5/2005 | Nagaraj et al. | |
| 6,933,066 B2 | 8/2005 | Nagaraj et al. | |
| 6,982,126 B2 * | 1/2006 | Darolia et al. ............. 428/701 |
| 7,449,254 B2 * | 11/2008 | Spitsberg et al. ............ 428/701 |
| 2005/0112412 A1 * | 5/2005 | Darolia et al. ............. 428/702 |
| 2005/0118334 A1 * | 6/2005 | Gorman et al. ............. 427/252 |
| 2006/0093850 A1 * | 5/2006 | Darolia et al. ............. 428/680 |
| 2006/0166018 A1 * | 7/2006 | Spitsberg et al. ............ 428/471 |
| 2007/0172703 A1 * | 7/2007 | Freling et al. ............... 428/702 |
| 2009/0038935 A1 * | 2/2009 | Floyd et al. ............. 204/192.11 |
| 2009/0178413 A1 * | 7/2009 | Lee .............................. 60/752 |

* cited by examiner

*Primary Examiner*—Jennifer C McNeil
*Assistant Examiner*—Vera Katz
(74) *Attorney, Agent, or Firm*—McNees Wallace & Nurick LLC

(57) ABSTRACT

A gas turbine engine component and coating system including a superalloy substrate having a coating system disposed thereon. A bond coating may be applied to the substrate. An adherent layer of ceramic material forming a thermal barrier coating is present on the bond coat layer. A topcoat layer overlies the thermal barrier coating. The topcoat layer includes greater than about 20 wt % yttria.

16 Claims, 2 Drawing Sheets

YTTRIA CONTAINING THERMAL BARRIER COATING TOPCOAT LAYER AND METHOD FOR APPLYING THE COATING LAYER

FIELD OF THE INVENTION

The present invention is directed to environmentally resistant thermal barrier coating systems for use in gas turbine engines. In particular, the present invention is directed to a top coating overlying a thermal barrier coating on turbine components of a gas turbine engine that provides resistance to calcium-magnesium-aluminum-silicate containing particulate contamination.

BACKGROUND OF THE INVENTION

The use of thermal barrier coatings (TBC) on components such as combustors, high pressure turbine (HPT) blades, vanes and shrouds is increasing in commercial as well as military gas turbine engines. The thermal insulation provided by a TBC enables such components to survive higher operating temperatures, increases component durability, and improves engine reliability. TBC is typically a ceramic material deposited on an environmentally-protective bond coat to form what is termed a TBC system. Bond coat materials widely used in TBC systems include oxidation-resistant overlay coatings such as MCrAlX (where M is iron, cobalt and/or nickel, and X is yttrium or another rare earth element), diffusion coatings such as diffusion aluminides that contain aluminum intermetallics.

Ceramic materials and particularly binary yttria-stabilized zirconia (YSZ) are widely used as TBC materials because of their high temperature capability, low thermal conductivity, and relative ease of deposition such as by air plasma spraying (APS), flame spraying such as hyper-velocity oxy-fuel (HVOF), physical vapor deposition (PVD) and other known TBC application techniques. TBCs formed by these methods generally have a lower thermal conductivity than a dense ceramic of the same composition as a result of the presence of microstructural defects and pores at and between grain boundaries of the TBC microstructure.

TBCs employed in the highest temperature regions of gas turbine engines are often deposited by electron beam physical vapor deposition (EBPVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma/cathodic arc deposition, and all forms of melting and evaporation deposition processes (e.g., laser melting, etc.).

Under service conditions, these TBC coated hot section engine components can be susceptible to various modes of damage, including erosion, oxidation and corrosion from exposure to the gaseous products of combustion, foreign object damage and attack from environmental contaminants. The source of the environmental contaminants is ambient air, which is drawn in by the engine for cooling and for combustion. The type of environmental contaminants in ambient air will vary from location to location, but can be of a concern to aircraft as their purpose is to move from location to location. Environmental contaminants that can be present in the air include sand, dirt, volcanic ash, sulfur in the form of sulfur dioxide, fly ash, particles of cement, runway dust, and other pollutants that may be expelled into the atmosphere, such as metallic particulates, such as magnesium, calcium, aluminum, silicon, chromium, nickel, iron, barium, titanium, alkali metals and compounds thereof, including oxides, carbonates, phosphates, salts and mixtures thereof. These environmental contaminants are in addition to the corrosive and oxidative contaminants that result from the combustion of fuel. However, all of these contaminants can adhere to the surfaces of the hot section components, which are typically thermal barrier coated.

In order for a TBC to remain effective throughout the planned life cycle of the component it protects, it is important that the TBC has and maintains integrity throughout the life of the component, including when exposed to contaminants. Some contaminants may result in TBC loss over the life of the components. For example, calcium-magnesium-aluminum-silicate (CMAS) particulates are often contained in the atmosphere of areas having fine sand and/or dust. CMAS infiltration is a phenomenon that is linked to thermal barrier coating (TBC) spallation in hot section turbine components. A typical composition for CMAS includes a low melting point deposit having about 35 mol % CaO, about 10 mol % MgO, about 7 mol % $Al_2O_3$, about 48 mol % $SiO_2$, about 3 mol % $Fe_2O_3$ and about 1.5 mol % NiO. Surfaces operating at temperatures of greater than about 2240° F. (1227° C.) may come into contact with CMAS, which becomes a liquid and infiltrates into the columnar structure of the TBC. The CMAS interferes with the compliance of the columnar structure of the TBC resulting in spallation and degradation of the TBC. In addition, CMAS may infiltrate into dense vertically cracked TBC or into the horizontal splat boundaries of thermally and plasma sprayed microstructures and cause spallation and/or other degradation to the TBC structure. In addition to the compliant loss, deleterious chemical reactions with yttria and zirconia within the TBC, as well as with the thermally-grown oxide at the bond coating/TBC interface, occur and result in a degradation of the coating system. Continued operation of the engine once the passive thermal barrier protection has been lost leads to oxidation of the base metal superalloy protective coating and the ultimate failure of the component by burn through cracking.

An attempt to mitigate the affect of the CMAS on high pressure turbine blades has been to apply a thin layer of aluminum ($Al_2O_3$) on the TBC to increase the melting point of CMAS about 100 to 150° F. (38° C. to 66° C.). The addition of the aluminum oxide provides an increase in operating temperature of up to about 2400° F. (1316° C.) with reduced infiltration of liquid CMAS. However, grinding during manufacture and assembly, as well as grinding and rubbing during gas turbine engine operation of a turbine shroud make the addition of an aluminum oxide layer difficult and impractical as well as provides additional manufacturing cost and complexity, wherein turbine blades which are subjected to gas and particle erosion would have different requirements for aluminum oxide overcoating and concern about eroding away of the alumina coating. In addition, thicker alumina layers are subject to coefficient of thermal expansion mismatches within the TBC coating system, resulting in thermal strains during cycling.

What is needed is an improved system and method for providing resistance to contaminants, such as CMAS, to gas turbine engine components that operate at temperatures above the melting temperatures of the contaminants.

SUMMARY OF THE INVENTION

A first aspect of the present invention includes a gas turbine engine component including a superalloy substrate. A bond coating may be applied to the substrate. An adherent layer of ceramic material forming a thermal barrier coating is present on the bond coat layer. A topcoat layer overlies the thermal barrier coating. The topcoat layer includes greater than about 20 wt % yttria.

Another aspect of the present invention includes CMAS resistant coating system having an adherent layer of ceramic material forming a thermal barrier coating on the substrate wherein a topcoat layer overlies the thermal barrier coating. The topcoat layer includes greater than about 20 wt % yttria.

Still another aspect of the present invention includes a method of forming a CMAS resistant coating. The method includes providing a superalloy gas turbine engine component. A bond coat layer is applied to the substrate. An adherent layer of ceramic material is applied forming a thermal barrier coating on the bond coat layer. A topcoat layer is applied to the thermal barrier coating. The topcoat layer includes greater than about 20 wt % yttria.

An embodiment of the present invention provides reduced or eliminated infiltration of CMAS into thermal barrier coatings.

$Y_2O_3$ has similar vapor pressure and deposition characteristics as zirconia providing a uniform and stable composition throughout the coating system.

An embodiment of the present invention increases gas turbine engine component life.

An embodiment of the present invention is capable of operating at higher temperatures in atmospheres containing CMAS.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention is generally applicable to components subjected to high temperatures, and particularly to components such as the high pressure and low pressure turbine vanes (nozzles) and blades (buckets), shrouds, combustor liners and augmentor hardware of gas turbine engines. The invention provides a thermal barrier coating (TBC) system suitable for protecting those surfaces of a gas turbine engine component that are subjected to hot combustion gases. While the advantages of this invention will be described with reference to gas turbine engine components, the teachings of the invention are generally applicable to any component on which a TBC may be used to protect the component from a high temperature environment, particularly environments containing CMAS.

Figure 1:
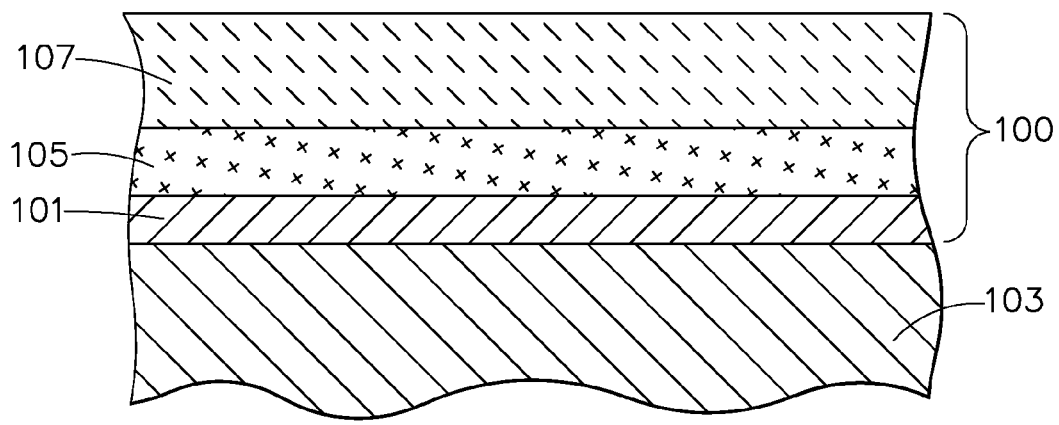
FIG. 1 shows a schematic cross-sectional view of a coating system according to an embodiment of the present invention.
Figure 2:
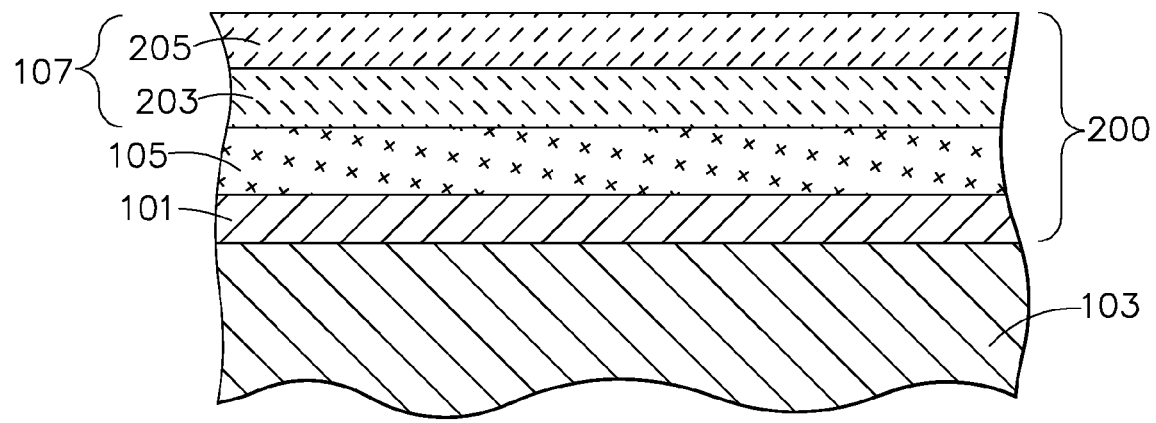
FIG. 2 shows a schematic cross-sectional view of a coating system according to another embodiment of the present invention.

Coating systems in accordance with exemplary embodiments of this invention are represented in FIGS. 1 and 2. In each embodiment, the coating system 100 is shown as including a metallic bond coat layer 101 that overlies the surface of a substrate 103, the latter of which is typically a superalloy and the base material of the component protected by the coating system 100. As is typical with TBC coating systems for gas turbine engine components, the bond coat layer 101 is preferably an aluminum-rich composition, such as an overlay coating of an MCrAlX alloy or a diffusion coating such as a diffusion aluminide or a diffusion platinum aluminide of a type known in the art. Aluminum-rich bond coats of this type develop an aluminum oxide (alumina) scale, which is grown by oxidation of the bond coat layer 101. The alumina scale chemically bonds a TBC undercoating 105 to the bond coat layer 101 and substrate 103. Preferably, although not necessarily, the bond coat layer 101 thickness is between about 2 to 10 mils (about 51 to about 254 micrometers) and is substantially uniform. The bond coat layer 101 may also be treated, e.g., by peening and/or heat treating, to densify any voids and to improve the structure of the bond coating. Generally, an alumina scale is formed on the bond coat layer 101 by oxidation of the aluminum in the bond coat layer 101, or alternatively may be formed directly on an aluminum-containing substrate 103 without utilizing a bond coat layer 101. The thermal barrier coating layer, or undercoat layer 105 comprised of a ceramic material such as yttria stabilized zirconia (YSZ), is then deposited on the bond coat layer 101, for example by electron beam physical vapor deposition (EB-PVD) or other known methods.

The TBC undercoating 105 of FIGS. 1 and 2 is only schematically represented. As known in the art, one or more of the individual layers of the TBC undercoating 105 may have a strain-tolerant microstructure of columnar grains as a result of being deposited by a physical vapor deposition technique, such as EBPVD. Alternatively, one or more of the layers may have a noncolumnar structure as a result of being deposited by such methods as plasma spraying, including air plasma spraying (APS). Layers of this type are in the form of molten "splats," resulting in a microstructure characterized by irregular flattened grains and a degree of inhomogeneity and porosity, which features are deleterious to thermal protection properties of the undercoating 105.

Although not required, after deposition of the TBC undercoating 105 and before application of a topcoat layer, the exposed surface of the undercoating 105 can be treated in order to provide a desired roughness of the exposed surface. While the roughness may be adjusted to suit the particular type of TBC material, a preferred roughness is between about 80-125 microinches for a YSZ TBC. The exposed TBC undercoating 105 surface may further also be cleaned to remove debris and contaminants from the exposed surface, such as by application of acetone or other solvents, followed by drying or heating to remove any residual solvent before applying a heat-absorbing topcoat layer 107 onto the exposed surface so as to overlie the thermal barrier coating and form a continuous overcoat on the thermal barrier coating. Another embodiment of the present invention includes an undercoating 105 and a topcoat layer 107 not as discreet layers, but include a concentration gradient of $Y_2O_3$ ranged from a higher concentration in an outer portion of the undercoating 105, forming a gradient topcoat layer 107 in a deposition cycle.

The present invention provides compositions and structures for overcoating of a substrate 103 having a TBC undercoating 105 deposited thereon. The overcoating, here a topcoat layer 107, further reduces the thermal conductivity of the coating system 100 by incorporating a low conductivity material. Exemplary topcoat layer 107 component materials comprise yttria ($Y_2O_3$). The topcoat layer 107 may further comprise zirconia ($ZrO_2$), hafnia ($HfO_2$) or combinations thereof In addition, $Y_2O_3$ has similar vapor pressure and deposition characteristics as zirconia. The similarities in properties permits ease of coating during deposition and provide a substantially uniform composition throughout the coating system 100.

For example, the topcoat layer 107 may be applied by any suitable processing method known for applying ceramic material-suitable application methods, including but not limited to, physical vapor deposition, such as electron beam physical vapor deposition, plasma spray, such as air plasma spray, sputtering or any other suitable coating method for applying ceramic material. Preferably, immediately upon application, the topcoat layer 107 is comprised of at least 20 wt % yttria or about 12 mol % yttria. The balance of the topcoat layer 107 is preferably a ceramic material, such as zirconia, hafnia or combinations thereof In one embodiment, the yttria coating topcoat layer 107 contains greater than about 20 wt % (about 12 mol %) yttria, balance essentially zirconia, preferably greater than about 50 wt % (about 35 mol %) yttria, balance essentially zirconia, and more preferably greater than about 75 wt % (about 62 mol %) yttria, balance essentially zirconia. Another embodiment of the invention includes a yttria coating topcoat layer 107 having yttria and hafnia, wherein the topcoat layer 107 contains greater than about 20 wt % (about 19 mol %) yttria, balance essentially hafnia, preferably greater than about 50 wt % (about 48 mol %) yttria, balance essentially hafnia, and more preferably greater than about 75 wt % (about 74 mol %) yttria, balance essentially hafnia. In still another embodiment of the invention, the topcoat layer 107 contains 100% yttria. In still another embodiment of the present invention, the topcoat layer 107 further contains, in addition to $Y_2O_3$, other oxides such as hafnia, gadolinia, neodymia, erbia, dysprosia, europia, tantala, yttebria, and titania.

Exemplary embodiments of the invention are represented in FIGS. 1 and 2. Each embodiment incorporates a topcoat layer 107 over a TBC. With reference to FIG. 1, the coating system 100 is shown as comprising a single undercoat layer 105 lying directly on the bond coat layer 101, although multiple layer TBC undercoat layers 105 can also be provided within the scope of the invention. A preferred composition for the TBC undercoat layer 105 is based on binary yttria-stabilized zirconia (YSZ). In one example, the binary yttria-stabilited zirconia contains about 4 to about 8 weight percent yttria, with the balance zirconia. However, other zirconia-based ceramic materials could also be used with this invention, such as zirconia, hafnia or combinations thereof, fully stabilized by yttria, nonstabilized zirconia, or zirconia partially or fully stabilized by ceria, magnesia, scandia and/or other oxides. According to another aspect of the invention, a suitable material for the undercoat layer 105 is YSZ containing about 4 to about 8 weight percent yttria stabilized with hafnia. Another embodiment of the invention includes an underlayer 105 that has a lower thermal conductivity than the 7 weight percent yttria/zirconia (7YSZ) TBC, wherein the underlayer additionally includes an oxide. These zirconia based TBC layer may contain, in addition to $Y_2O_3$, other oxides such as hafnia, gadolinia, neodymia, erbia, dysprosia, europia, tantala, yttebria, and titania.

As shown in FIG. 1, the undercoat layer 105 is deposited directly over the bond coat layer 101 that lies on the substrate 103. The undercoat layer 105 has a thickness that is sufficient to provide a suitable stress distribution within the coating system 100 to promote the mechanical integrity of the coating. A suitable thickness for this purpose is generally on the order of about 1 to about 20 mils (about 25 to about 508 micrometers). The topcoat layer 107 is applied over the undercoat layer 105 and is sufficiently thick to provide the desired level of contaminant resistance and thermal protection in combination with the undercoat layer 105. While coating thickness depends on the particular application, a suitable thickness for the topcoat layer 107 may be about 0.5 to about 60 mils (about 13 to about 1524 micrometers).

In view of the above, it can be appreciated that each of the TBC coating system 100 of this invention employ a TBC undercoat layer 105 whose susceptibility to CMAS contamination is reduced or eliminated by the addition of a topcoat layer 107, wherein the topcoat layer 107 reacts with CMAS to form a dense adherent sealing layer during operation, providing additional protection to underlying YSZ and other conventional TBC materials.

Figure 3:
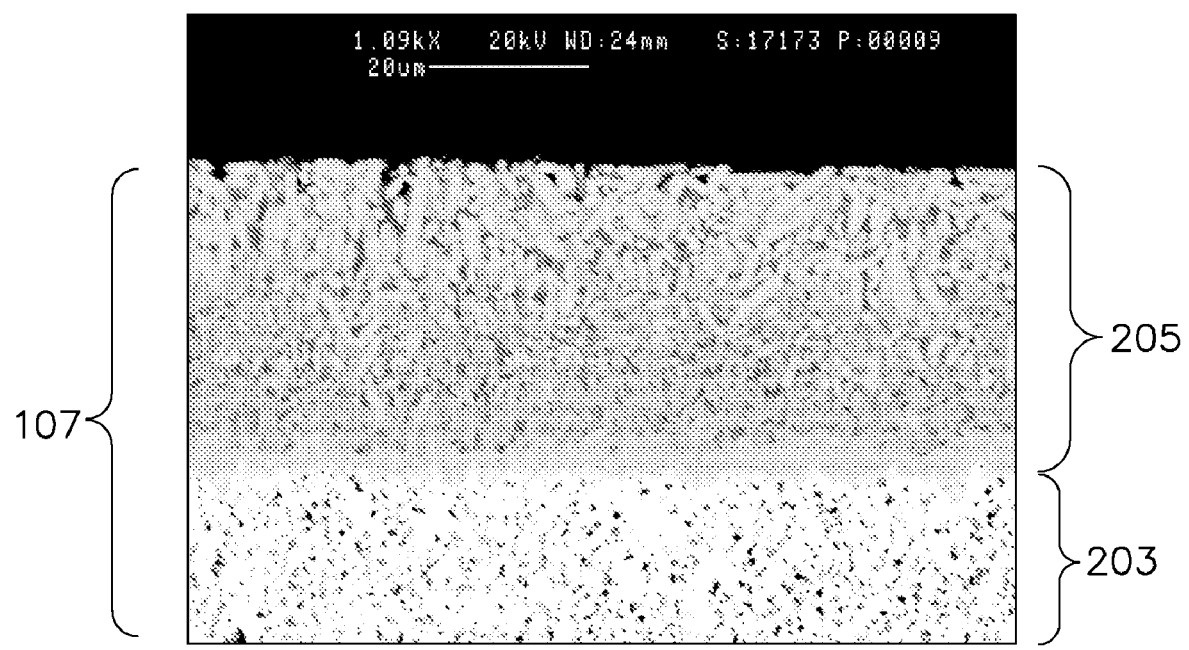
FIG. 3 shows a photomicrograph of a portion of a coating system according to another embodiment of the present invention.

FIG. 2 illustrates a coating system 200 according to another embodiment of the present invention wherein the coating system 100 has been exposed to elevated temperatures, such as temperatures greater than about 2240° F. (1227° C.) and CMAS for sufficient time to form a reaction layer 205. Suitable exposure may be provided in a controlled atmosphere or during gas turbine engine operation. As shown in FIG. 2, the undercoat layer 105 is deposited directly over the bond coat layer 101 that lies on the substrate 103. The topcoat layer 107 has been applied over the undercoat layer 105 and has been exposed to elevated temperature and CMAS. The topcoat layer 107 includes a reaction layer 205 made up of reaction products resulting from the reaction between CMAS and yttria. The reaction products include a yttrium calcium silicate phase having a needle-like geometry, which is very dense and resistant to infiltration of liquid CMAS. Reaction layer 205 provides a barrier preventing or eliminating infiltration of liquid CMAS into the underlying undercoat layer 105, which provides the undercoat layer 105 with resistance to spallation due to contaminant infiltration. FIG. 3 shows a reaction layer 205 containing a yttrium calcium silicate phase according to an embodiment of the present invention. The topcoat layer 107 further may include unreacted layer 203 which remains substantially unreacted and provides additional available yttria for reaction with CMAS and provides an additional barrier against infiltration of CMAS into the undercoat layer 105.

In one embodiment, a superalloy high pressure turbine blade or nozzle is provided as a substrate with an alumina forming bond coating 101 having a thickness of from about 1 to about 6 mils (about 25 to about 152 micrometers). A 7 wt % yttria stabilized zirconia thermal barrier coating underlayer 105 is applied to the bond coating 101 to a thickness of about 1 to about 10 mils (about 25 to about 254 micrometers). Thereafter a yttria coating topcoat layer containing about 50 mol % (about 65 wt %) yttria, balance zirconia, is applied to a thickness of about 0.5 to about 4 mils (about 13 to about 102 micrometers). The high pressure turbine blade or nozzle is then exposed to gas turbine engine operating temperatures.

In another embodiment, a superalloy high pressure turbine shroud is provided with an alumina forming bond coating 101 having a thickness of from about 2 to about 10 mils (about 50 to about 254 micrometers). A 7 wt % yttria stabilized zirconia thermal barrier coating underlayer 105 is applied to the bond coating to a thickness of about 2 to about 20 mils (about 51 to about 508 micrometers). Thereafter a yttria coating topcoat layer 107 containing greater than about 50 mol % (about 65 wt %) yttria, balance zirconia, is applied to a thickness of about 2 to about 50 mils. The high pressure turbine shroud is then exposed to gas turbine engine operating temperatures.

In still another embodiment, a superalloy high pressure turbine is provided with an alumina forming bond coating having a thickness of from about 2 to about 10 mils (about 50 to about 254 micrometers). A 7 wt % yttria stabilized zirconia thermal barrier coating underlayer 105 is applied to the bond coating 101 to a thickness of up to about 5 to about 10 mils (about 127 to about 254 micrometers), wherein the yttria concentration of the thermal barrier coating is increased from 7 wt % at about 5 to about 10 mils (about 127 to about 254 micrometers) thickness to about 50 mol % (about 65 wt %) yttria, balance zirconia at from about 7 mils to about 50 mils (about 178 to about 1270 micrometers), thickness of the thermal barrier coating. In this embodiment, the outer portions of the thermal barrier coating underlayer 105 and the topcoat layer 107 having greater than 20 wt % yttria are available for reaction with CMAS containing atmospheres in an outer portion.

After exposure to gas turbine engine operating temperature, including temperatures greater than about 2240° F. (1227° C.), the yttria coating topcoat of the blade, nozzle and/or shroud forms a dense layer of reaction product layer from reactions between the yttria and a CMAS containing atmosphere. The coating 107 having the reaction product layer 205 has little or no liquid CMAS infiltration into the thermal barrier coating underlayer 105, and thereby exhibits high resistance to spallation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas turbine engine component comprising:
   a superalloy substrate;
   a bond coat layer on the substrate;
   an adherent layer of ceramic material forming a thermal barrier coating on the bond coat layer, the thermal barrier coating comprising from about 4 wt % to about 8 wt % yttria stabilized zirconia; and
   a topcoat layer applied to the thermal barrier coating, the topcoat layer comprising greater than about 75 wt % yttria;
   wherein the topcoat layer includes a concentration gradient having an increasing concentration of yttria from the thermal barrier coating.

2. The component of claim 1, wherein the topcoat layer includes a reaction layer, the reaction layer comprising a yttrium calcium silicate phase having a needle-like geometry.

3. The component of claim 1, wherein the thermal barrier coating further comprises an oxide selected from the group consisting of hafnia, gadolinia, neodymia, erbia, dysprosia, europia, tantala, ytterbia, titania and combinations thereof.

4. The component of claim 1, wherein the balance of the topcoat layer consists essentially of zirconia.

5. The component of claim 1, wherein the balance of the topcoat layer consists essentially of hafnia.

6. The component of claim 1, wherein the topcoat layer further comprises an oxide selected from the group consisting of hafnia, gadolinia, neodymia, erbia, dysprosia, europia, tantala, ytterbia, titania and combinations thereof.

7. The component of claim 1, wherein the component is a turbine blade.

8. The component of claim 1, wherein the component is a turbine vane.

9. The component of claim 1, wherein the component is a turbine shroud.

10. A CMAS resistant coating system comprising:
    a ceramic material forming a thermal barrier coating on a substrate, the thermal barrier coating comprising from about 4 wt % to about 8 wt % yttria stabilized zirconia;
    a topcoat layer overlying the thermal barrier coating; and
    wherein the topcoat layer comprises greater than about 75 wt % yttria; and
    wherein the topcoat layer includes a concentration gradient having an increasing concentration of yttria from the thermal barrier coating.

11. The coating system of claim 10, wherein the topcoat layer includes a reaction layer, the reaction layer comprising a yttrium calcium silicate phase having a needle-like geometry.

12. The coating system of claim 11, wherein the reaction layer is the outermost layer of the coating system.

13. The coating system of claim 10, wherein the thermal barrier coating further comprises an oxide selected from the group consisting of hafnia, gadolinia, neodymia, erbia, dysprosia, europia, tantala, ytterbia, titania and combinations thereof.

14. The coating system of claim 10, wherein the balance of the topcoat layer consists essentially of zirconia.

15. The coating system of claim 10, wherein the balance of the topcoat layer consists essentially of hafnia.

16. The coating system of claim 10, wherein the topcoat layer further comprises an oxide selected from the group consisting of hafnia, gadolinia, neodymia, erbia, dysprosia, europia, tantala, ytterbia, titania and combinations thereof.

* * * * *